United States Patent [19]

Otsuka et al.

[11] Patent Number: 5,589,148
[45] Date of Patent: Dec. 31, 1996

[54] PROCESS FOR PURIFYING HALOGEN-CONTAINING GAS

[75] Inventors: Kenji Otsuka; Hideki Fukuda; Satoshi Arakawa, all of Hiratsuka, Japan

[73] Assignee: Japan Pionics Co., Ltd., Tokyo, Japan

[21] Appl. No.: 518,240

[22] Filed: Aug. 23, 1995

[30] Foreign Application Priority Data

Oct. 5, 1994 [JP] Japan .................... 6-266382

[51] Int. Cl.$^6$ ...................................... C01B 7/07
[52] U.S. Cl. ....................... 423/240 S; 423/500
[58] Field of Search ................. 423/240 S, 500, 423/240 R

[56] References Cited

U.S. PATENT DOCUMENTS

| | | | |
|---|---|---|---|
| 1,359,047 | 11/1920 | Frary et al. | 423/500 |
| 2,785,055 | 3/1957 | Redcay | 423/500 |
| 3,375,077 | 3/1968 | Bloch et al. | 423/500 |
| 3,772,425 | 11/1973 | Kang et al. | 423/500 |
| 4,131,626 | 12/1978 | Sharma et al. | 423/502 |
| 4,201,751 | 5/1980 | Holter et al. | 423/240 S |
| 4,744,964 | 5/1988 | Kühl | 423/240 S |
| 5,019,364 | 5/1991 | Kitahara et al. | 423/210 |
| 5,322,674 | 6/1994 | Mori | 423/240 S |

FOREIGN PATENT DOCUMENTS

| | | | |
|---|---|---|---|
| 595809 | 4/1960 | Canada | 423/500 |
| 0173640 | 3/1986 | European Pat. Off. | 423/240 S |
| 0414292 | 2/1991 | European Pat. Off. | |
| 0441236 | 8/1991 | European Pat. Off. | |
| 0673669 | 9/1995 | European Pat. Off. | |
| 1109151 | 6/1961 | Germany | 423/500 |
| 2931546 | 2/1981 | Germany | 423/240 S |
| 4323647 | 1/1995 | Germany | |
| 56-130211 | 10/1981 | Japan | 423/240 S |
| 57-127424 | 8/1982 | Japan | 423/240 S |
| 62-4430 | 1/1987 | Japan | 423/240 S |
| 3-12303 | 1/1991 | Japan | |

OTHER PUBLICATIONS

Derwent Publications Ltd., Database WPI, 24 Oct. 1995, Section Ch, Week 9551, Class E31, AN 95–399638 of JP–A–07 275 664 (Nippon Pionics Co. Ltd.), London, GB,.

*Primary Examiner*—Ngoc-Yen Nguyen
*Attorney, Agent, or Firm*—Frishauf, Holtz, Goodman, Langer & Chick, P.C.

[57] ABSTRACT

There is disclosed a process for purifying a halogen-containing gas (halogen gas such as chlorine, fluorine alone or diluted with an inert gas) which comprises bringing the halogen-containing gas into contact with a purifying agent comprising a hydroxide of an alkaline earth metal such as strontium hydroxide and an iron oxide such as triiron tetraoxide to efficiently remove hydrogen halogenides such as hydrogen chloride and hydrogen fluoride along with moisture that are contained as impurities in the halogen-containing gas. The above process enables the formation of a non-corrosive halogen-containing gas having an extremely high purity and capable of being favorably used as etching gas for silicon films, aluminum alloy films, etc. in a semiconductor manufacturing process.

19 Claims, No Drawings

5,589,148

PROCESS FOR PURIFYING HALOGEN-CONTAINING GAS

BACKGROUND OF THE INVENTION

1. Field of the Invention

The present invention relates to a process for purifying a halogen-containing gas. More particularly, it pertains to a process for removing a hydrogen halogenide such as hydrogen chlorides hydrogen bromide and hydrogen fluoride as well as moisture that are contained as impurities in a halogen-containing gas as low as a ultralow concentration to provide a halogen gas or an inert gas-containing halogen gas each free from a hydrogen halogenide and moisture.

A halogen gas such as chlorine and fluorine and a gas containing the above-mentioned halogen gas (hereinafter sometimes collectively referred to as "halogen-containing gas") are employed in relatively large amounts for the etching of a single crystal silicon film, aluminum film and aluminum alloy film in a semiconductor manufacturing process. With the remarkable advance of the semiconductor manufacturing technique in recent years and at the present time, it is required that the aforesaid halogen-containing gas be ultralow in the content of impurities such as a hydrogen halogenide, moisture and the like.

2. Description of the Related Arts

A halogen-containing gas to be used in a semiconductor manufacturing process or the like is supplied usually in the form of being filled in a vessel such as a gas cylinder. A crude halogen-containing gas frequently contains about 5 ppm or more of a hydrogen halogenide, moisture and the like as an impurities, which is responsible for trouble due to the corrosion of manufacturing equipment such as gas supply piping and for the occurrence of off-specification products due to the etching of a semiconductor thin film.

It is thought that moisture among the aforestated impurities can be removed to some extent by bringing a moisture-containing gas into contact with a publicly known zeolite. In recent years, however, it has been made possible to highly purify silane as a principal raw material for manufacturing semiconductors by removing oxygen contained therein as an impurity as low as 0.01 ppm or less. (Refer to Japanese Patent Application Laid-Open No.12303/1991.) Likewise, it it desired that a halogen-containing gas to be used under the circumstance similar to the above be highly purified by removing hydrogen halogenide and moisture contained in the halogen-containing gas as impurities as low as the same level as above so as to attain the purpose of preventing corrosion and the occurrence of off-specification products.

In addition, there is the possibility of such impurities as moisture and air mixing in the above-mentioned raw material gas at the time of exchanging gas cylinders or switching supply piping during the course of supplying the gas to the semiconductor manufacturing equipment. Accordingly, it is desired to ultimately remove the impurities immediately before the raw material gas enters the manufacturing equipment.

Nevertheless, almost nothing has been found with regard to the technique capable of simultaneously or separately removing, in high efficiency, hydrogen halogenide and/or moisture contained as impurities in a halogen gas such as chlorine, fluorine or the like.

SUMMARY OF THE INVENTION

Under such circumstances, intensive research and investigation were undertaken by the present inventors to solve the above-mentioned problems. As a result, it has been found that hydrogen halogenides and/or moisture contained as impurities in a halogen-containing gas can be removed, whereby equipment corrosion and the occurrence of off-specification products can be prevented by the use of a mixture of an hydroxide of an alkaline earth metal and an iron oxide as an effective ingredient in a purifying agent. The present invention has been accomplished by the aforesaid finding and information.

Specifically the present invention relates to a process for purifying a halogen-containing gas which comprises bringing said halogen-containing gas into contact with a purifying agent comprising an hydroxide of an alkaline earth metal and an iron oxide each as an effective ingredient to remove hydrogen halogenides and/or moisture contained as impurities in said halogen-containing gas.

DESCRIPTION OF PREFERRED EMBODIMENT

The purification process according to the present invention is directed to a halogen-containing gas including a halogen gas alone such as chlorine, fluorine and bromine and a halogen gas diluted with an inert gas such as nitrogen, argon and helium and is applied to the purification of the halogen-containing gas for the purpose of separately or simultaneously removing, in high efficiency, hydrogen halogenide such as hydrogen chloride, hydrogen bromide and hydrogen fluoride and/or moisture contained as an impurity in the aforesaid halogen-containing gas.

There is employed in the present invention a purifying agent comprising a hydroxide of an alkaline earth metal and an iron oxide each as an effective ingredient. As the hydroxide of an alkaline earth metal, various hydroxides are available including strontium hydroxide, calcium hydroxide, magnesium hydroxide, barium hydroxide and any of the hydrates thereof, and each of them may be used alone or in combination with at least one other one.

Of the above-mentioned hydroxides of the alkaline earth metal, strontium hydroxide, calcium hydroxide and magnesium hydroxide are preferable because of excellent moldability obtained by mixing it with an iron oxide as well as surpassingly excellent removal-performance for both hydrogen halogenides and moisture. Among them, a hydroxide composed principally of strontium hydroxide is particularly preferable.

Strontium hydroxide [$Sr(OH)_2$] can be produced, for example, by the reaction between strontium chloride and sodium hydroxide, but is advantageously available on the market in the form of an octahydrate or the like having a purity of 98% or more.

The strontium hydroxide may be used in the form of a octahydrate as such available on the market, a stable monohydrate or equivalent which can be produced with comparative ease, by heating the octahydrate to about 80° C., or anhydride which is free from the water of crystallization.

As the iron oxide, mention may be made of triiron tetraoxide [$Fe_3O_4$, iron(II)iron(III) oxide], iron (II) oxide [FeO], iron (II) hydroxide [$FeO \cdot H_2O$] which is the monohydrate of the iron (II) oxides, iron (III) oxide [$Fe_2O_3$] and iron (III) hydroxide [FeO(OH), $Fe(OH)_3$].

Any of the above-mentioned iron oxides may be used alone or in the form of a mixture with at least one other iron oxide, and in the latter case, the mixture is usually composed preferably of triiron tetraoxide, iron (II) oxide or iron (II) hydroxide each in a high content, more preferably of triiron tetraoxide in an amount of at least 60%, furthermore preferably at least 80% by weight.

The above-mentioned iron oxide can be produced by any of the following processes.

The triiron tetraoxide can be produced by blowing ammonia into iron (II) sulfate to form iron (II) hydroxide and then oxidizing the resultant iron (II) hydroxide with sodium hydroxide and nitric acid. There is available on the market, however, triiron tetraoxide with a purity of 95% or more as black iron oxide, which can usually be used as such in the present invention.

The iron (II) oxide can be produced, for example, by reducing iron (III) oxide with hydrogen, by heating iron under a low oxygen partial pressure, by heating iron (II) oxalate in the absence of air or by heating drying iron (II) hydroxide in an atmosphere of an inert gas.

The iron (II) hydroxide can be produced, for example, by reacting iron (II) sulfate or iron (II) chloride with sodium hydroxide. Iron (III) oxide and iron (III) hydroxide that are available on the market can be used in the present invention.

Of the above-mentioned iron oxides, iron (II) oxide and iron (II) hydroxide are generally unstable compounds and difficult to obtain in high purity. However, it is not necessarily required to use highly pure compounds in the present invention and an other iron oxide is permitted to be mixed in them. It is preferable that the iron (II) oxide and iron (II) hydroxide be preserved without being in contact with air as much as possible and be handled in an atmosphere of an inert gas by means of a gloved box.

The proportion of the hydroxide of an alkaline earth metal to the iron oxide varies depending upon the kinds and concentrations, etc. of the sour gases contained in the halogen-containing gas to be treated and thus, can not be unequivocally specified but is usually set to 15:1 to 1:12, preferably 10:1 to 1:6 expressed in terms of M:Fe atomic ratio wherein M is the amount of an alkaline earth metal or the total amount of a plurality of said metals such as Sr, Ca, Mg and Ba, and Fe is metallic iron.

In order to prepare the purifying agent, the hydroxide of an alkaline earth metal and the iron oxide may be blended at a prescribed ratio to form a mixture, or the composition comprising the mixture may be molded as such. Alternatively, the composition of the aforesaid mixture and an inorganic carrier such as alumina, silica, silica-alumina, aluminosilicate or diatomaceous earth incorporated therein may be molded, or the aforesaid mixture may be supported on a carrier which has been molded in advance. Of these, the preferable purifying agent is that molded from the composition comprising the mixture as it is, or that molded from a mixture of the hydroxide of an alkaline earth metal, the iron oxide and a carrier by extrusion molding, tabletting molding or the like. A particularly preferable purifying agent among them is that molded from the composition comprising the mixture of strontium hydroxide and the iron oxide as such without using a carrier or the like.

It is preferable in molding for the purpose of enhancing the moldability and molding strength that a mixture or a composition to be formed into the purifying agent be incorporated with at least one binding agent such as polyvinyl alcohol, polyalkylene glycol (polyethylene glycol, polypropylene glycol, etc.), alkylcellulose (methylcellulose, etc.) and carboxymethylcellulose, preferably polyvinyl alcohol. The amount of the binding agent to be incorporated is determined on the basis of the constitution of the composition or the mixture, molding conditions and the like, and is usually 0.1 to 20, preferably 0.5 to 10 parts by weight per 100 parts by weight of the composition or mixture to be formed into the purifying agent.

Various methods are available for preparing the purifying agent and are exemplified by (1) a method in which a mixture obtained by preliminarily mixing the hydroxide of an alkaline earth metal and the iron oxide at a prescribed ratio is incorporated with an aqueous solution of a binding agent with stirring to form a slurry or a cake, which is molded by extrusion, and the resultant molding is cut into a proper length to form pellets, which are dried by heating at 80° to 150° C., approximately in a drier to form the purifying agent; (2) a method in which the above-mentioned slurry or cake is dried by heating and then ground, followed by tabletting molding into the purifying agent; and (3) a method in which the above-mentioned slurry or cake is molded into granules with a granulating machine or the like and the resultant granules are dried under heating into the purifying agent. Of these the method (1) is generally preferable because of its ease of the processability, selection of shape and size, and the like.

The size and shape of the molded purifying agent is not specifically limited, but is typified by a sphere, a column, a cylinder, a granule, etc. The size thereof is usually 0.5 to 10 mm in diameter for a spherical form, 0.5 to 10 mm in diameter with a height of 2 to 20 mm for a columnar form such as pellet and tablet and 0.84 to 5.66 mm in terms of an opening of a sieve to pass through for an irregular form such as a granular form.

The bulk density in the case of the purifying agent being packed in a purifying column is usually 0.6 to 2.0 g/milliliter (mL).

The purifying agent according to the present invention is packed in a purifying column, which is usually in the form of a fixed bed, and a halogen-containing gas as the raw material is allowed to flow through the column and brought into contact with the purifying agent so that the hydrogen halogenides and moisture as impurities are removed from the gas.

The packing length of the purifying agent to be packed in a purifying column is usually 50 to 1500 mm from the practical point of view. A packing length less than 50 mm brings about a fear of lowering purifying capability, whereas that more than 1500 mm brings about a fear of unreasonably increasing the pressure loss through the column.

The space linear velocity (LV) of the halogen-containing gas at the time of purification varies depending upon the concentrations of the impurities contained in the halogen-containing gas fed into the column as well as the operating conditions and thus can not unequivocally specified, but is usually at most 100 cm/sec, preferably at most 30 cm/sec.

The contact temperature of the halogen-containing gas with the purifying agent is not specifically limited, but is generally 200° C. or lower, usually ordinary temperature, thus dispensing with heating or cooling in particular.

Likewise, the pressure of the gas in the column is not specifically limited, but may be atmospheric or reduced pressure or in a pressurized state, and is usually at most 20 $kg/cm^2$ abs, preferably 0.1 to 10 $kg/cm^2$ abs.

In the case of treating the halogen-containing gas having a particularly high moisture content, it is possible to use a dehumidifying step with a dehumidifying agent such as zeolite in combination with the step of removing the hydrogen halogenides and moisture with the purifying agent. The use of the dehumidifying step enables the complete removal of the moisture in the gas and the formation of a purified gas with an extremely high purity, in detail, the halogen-containing gas free from moisture or a hydrogen halogenide.

By virtue of using the purifying agent comprising a hydroxide of an alkaline earth metal such as strontium hydroxide along with an iron oxide such as triiron tetraoxide as effective ingredients, it is made possible to effectively remove the hydrogen halogenides and moisture contained as impurities in the halogen-containing gas, which impurities have heretofore been difficult to remove and at the same time, to produce a purified gas with an extremely high purity. Accordingly, it is made possible to securely prevent the trouble due to the corrosion of gas supply piping for semiconductor manufacturing equipment, etc., after-corrosion due to dry etching, and occurrence of off-specification products due to etheing of aluminum line patterns.

In the following, the present invention will be described in more detail with reference to comparative examples and working examples, which however, shall not be construed to limit the present invention thereto.

EXAMPLE 1

(Preparation of purifying agent)

Strontium hydroxide [$Sr(OH)_2 \cdot 8H_2O$] with 99% purity in an amount of 248 g was mixed with 54 g of triiron tetraoxide (extra pure reagent, purity of 95% or more, produced by KANTO CHEMICAL Co., INC.) at an Sr:Fe atomic ratio of 4:3, and the resultant mixture was incorporated with a solution of 4 g of polyvinyl alcohol (PVA, produced by Shin-Etsu Chemical Co., Ltd. model PA-05) in 24 g of water under stirring. The resultant cake was extruded by means of an extruder (produced by Fuji Paudal Co., Ltd.) through 1.6 mm diameter nozzles. The molded product thus obtained was cut into pellets of about 3 to 5 mm in length, which were dried for about 12 hours in a drier under heating at 120° C. to afford 154 g of purifying agent A having a bulk density of 0.68 g/mL. The above-mentioned data are summarized in Table 1.
(Purification of chlorine gas)

The purifying agent A thus obtained in a volume of 63.1 milliliters (mL) was packed in a stainless steel-made purifying column having 16.4 mm inside diameter and 400 mm length (300 mm packing length). In passing chlorine gas through the purifying column from a chlorine gas cylinder to purify the gas, a flow rate of the chlorine gas was controlled to 0.633 liter (L)/min (space linear velocity: LV of 5 cm/sec) by the use of a mass flow controller, and the concentrations of hydrogen chloride and moisture added in the chlorine gas each as an impurity were set at 50 ppm and 200 ppm, respectively.
(Corrosion test)

Since a method for measuring slight amounts of a hydrogen halogenide and moisture contained in a halogen-containing gas had not yet been established, the purified chlorine gas was evaluated in the following manner.

The purified chlorine gas which was discharged from the purifying column was allowed to flow continuously for 16 hours through a SUS 316 L-EP-made pipe having ⅜ inch inside diameter and 400 mm length, the inside of which had been electrolytically polished, and thereafter the pipe was longitudinally split and the inside surface thereof was observed by means of a scanning electron microscope (product of Shimadzu Corporation). As a result, as shown in Table 2, no corrosion was recognized at all.

EXAMPLES 2 TO 8

(Preparation of purifying agents B to G)

Purifying agent B

The procedure in Example 1 (Preparation of purifying agent) was repeated to prepare purifying agent B except that polyethylene glycol (PEG, produced by KANTO CHEMICAL Co., INC.) was used in place of polyvinyl alcohol (PVA). As a result, purifying agent B having a bulk density of 0.64 g/mL was obtained in a yield of 150 g.
Purifying agent C The procedure in Example 1 (Preparation of purifying agent) was repeated to prepare purifying agent C except that 260 g (instead of 248 g) of strontium hydroxide was mixed with 27 g (instead of 54 g) of triiron tetraoxide at an Sr:Fe atomic ratio of 16:5.7 (instead of 4:3). As a result, purifying agent C having a bulk density of 0.68 g/mL was obtained in a yield of 135 g.
Purifying agent D The procedure in Example 1 (Preparation of purifying agent) was repeated to prepare purifying agent D except that 65 g (instead of 248 g) of strontium hydroxide was mixed with 108 g (instead of 54 g) of triiron tetraoxide at an Sr:Fe atomic ratio of 1:5.7 (instead of 4:3). As a result, purifying agent D having a bulk density of 0.75 g/mL was obtained in yield of 120 g.
Purifying agent E In a gloved box under an argon atmosphere, 1 kg (3.6 mol) of iron (II) sulfate heptahydrate (produced by KANTO CHEMICAL Co., INC.) procured from the market was dissolved in 10 liter (L) of water, and the resultant solution was incorporated with 1440 g (7.2 mol) of 20% by weight aqueous solution of sodium hydroxide under stirring to precipitate iron (II) hydroxide. The supernatant was removed by decantation, and the remaining precipitate was washed with water and dried by heating at 120° C. for 5 hours in a drier in an argon atmosphere to afford about 232 g of iron (II) oxide.

Subsequently in a gloved box under an argon atmosphere, the mixture of 248 g of strontium hydroxide and 50 g of the above-obtained iron (II) oxide (Sr:Fe atomic ratio of 4:3) was incorporated with a solution of 4 g of polyvinyl alcohol (PVA) in 24 g of water under stirring. The resultant cake was extruded by means of an extruder (produced by Fuji Paudal Co., Ltd.) through 1.6 mm diameter nozzles. The molded product thus obtained was cut into pellets of about 3 to 5 mm in length, which were dried for about 12 hours in a drier under heating at 120° C. to afford 150 g of purifying agent E having a bulk density of 0.62 g/mL.
Purifying agent F The procedure in Example 1 (Preparation of purifying agent) was repeated to prepare purifying agent F except that calcium hydroxide was used in place of strontium hydroxide and 54 g of calcium hydroxide was mixed with 54 g of triiron tetraoxide at an Ca:Fe atomic ratio of 4:3.8. As a result, purifying agent F having a bulk density of 0.70 g/mL was obtained in a yield of 97 g.
Purifying agent G The procedure in Example 1 (Preparation of purifying agent) was repeated to prepare purifying agent G except that magnesium hydroxide was used in place of strontium hydroxide and 69 g of magnesium hydroxide was mixed with 54 g of triiron tetraoxide at an Mg:Fe atomic ratio of 4:2.4. As a result, purifying agent G having a bulk density of 0.71 g/mL was obtained in a yield of 110 g. Details of the purifying agents B to G are given in Table 1.

TABLE 1

| Purifying agent | Hydroxide of alkaline earth metal (g) | Iron Oxide (g) | Atomic ratio (M*1:Fe) | Binding agent (g) | Water (g) | Bulk density (g/mL) |
|---|---|---|---|---|---|---|
| A | Sr(OH)$_2$ 248 | Fe$_3$O$_4$ 54 | 4:3 | PVA 4 | 24 | 0.68 |
| B | Sr(OH)$_2$ 248 | Fe$_3$O$_4$ 54 | 4:3 | PEG 4 | 24 | 0.64 |
| C | Sr(OH)$_2$ 260 | Fe$_3$O$_4$ 27 | 16:5.7 | PVA 4 | 24 | 0.68 |
| D | Sr(OH)$_2$ 65 | Fe$_3$O$_4$ 108 | 1:5.7 | PVA 4 | 24 | 0.75 |
| E | Sr(OH)$_2$ 248 | Fe$_3$O$_4$ 50 | 4:3 | PVA 4 | 24 | 0.62 |
| F | Ca(OH)$_2$ 54 | Fe$_3$O$_4$ 54 | 4:3.8 | PVA 4 | 24 | 0.70 |
| G | Mg(OH)$_2$ 69 | Fe$_3$O$_4$ 54 | 4:2.4 | PVA 4 | 24 | 0.71 |

Remarks M*1: Alkaline earth metal atom

EXAMPLES 2 TO 7

The procedure in Example 1 (Purification of chlorine gas) (Corrosion test) was repeated to purify chlorine gases and carry out corrosion tests for piping except that each of the purifying agents B to G was used for the purification.
(Purification of chlorine gas)

Each of the purifying agents B, C, D, E, F and G thus obtained in a volume of 63.1 milliliters (mL) was packed in a stainless steel-made purifying column having 16.4 mm inside diameter and 400 mm length (300 mm packing lenth). In passing chlorine gas through the purifying column from a chlorine gas cylinder to purify the gas, a flow rate of the chlorine gas was controlled to 0.633 liter (L)/min (space linear velocity:LV of 5 cm/sec) by the use of a mass flow controller, and the concentrations of hydrogen chloride and moisture added in the chlorine gas each as an impurity were set at 50 ppm and 200 ppm, respectively.
(Corrosion test)

In the same manner as in Example 1, piping corrosion tests were carried out for each of the purified chlorine gases discharged from the purifying column.

Each of the purified chlorine gases which was discharged from the purifying column was allowed to flow continuously for 16 hours through a SUS 316 L-EP-made pipe having 3/8 inch inside diameter and 400 mm length, the inside of which had been electrolytically polished, and thereafter the pipe was longitudinally split and the inside surface thereof was observed by means of a scanning electron microscope (product of Shimadzu Corporation). As a result, as shown in Table 2, no corrosion was recognized at all.

EXAMPLE 8

(Purification of fluorine gas)

The purifying agent A thus obtained in a volume of 63.1 milliliters (mL) was packed in a stainless steel-made purifying column having 16.4 mm inside diameter and 400 mm length (300 mm packing length). In passing fluorine gas through the purifying column from a fluorine gas cylinder to purify the gas, a flow rate of the fluorine gas was controlled to 0.633 liter (L)/min (space linear velocity:LV of 5 cm/sec) by the use of a mass flow controller, and the concentrations of hydrogen fluoride and moisture added in the fluorine gas each as an impurity were set at 50 ppm and 200 ppm, respectively.

(Corrosion test)

In the same manner as in Example 1, piping corrosion test was carried out for the purified fluorine gas.

The purified fluorine gas which was discharged from the purifying column was allowed to flow continuously for 16 hours through a SUS 316 L-EP-made pipe having 3/8 inch inside diameter and 400 mm length, the inside of which had been electrolytically polished, and thereafter the pipe was longitudinally split and the inside surface thereof was observed by means of a scanning electron microscope (product of Shimadzu Corporation). As a result, as shown in Table 2, no corrosion was recognized at all.

Comparative Example 1

In passing chlorine gas from a chlorine gas cylinder without passing through the purifying column, a flow rate of the chlorine gas was controlled to 0.633 liter (L)/min (space linear velocity:LV of 5 cm/sec) by the use of a mass flow controller, and the concentrations of hydrogen chloride and moisture added in the chlorine gas each as an impurity were set at 50 ppm and 200 ppm, respectively.

The chlorine gas thus regulated was allowed to flow continuously for 16 hours through a SUS 316 L-EP-made pipe having 3/8 inch inside diameter and 400 mm length, and thereafter the pipe was longitudinally split and the inside surface thereof was visually observed. As a result, severe corrosion of the pipe inside was visually recognized without the use of a microscope.

Comparative Example 2

Chlorine gas supplied from a chlorine gas cylinder was allowed to flow continuously for 16 hours directly through a SUS 316 L-EP-made pipe having 3/8 inch inside diameter and 400 mm length, at a flow rate of 0.633 L/min (space linear velocity:LV of 5 cm/sec), without passing through the purifying column and then the pipe was longitudinally split and the inside surface thereof was observed with a scanning electron microscope. As a result, slight but clear corrosion of the pipe inside was recognized.

TABLE 2

Corrosion Test for Purified Gas

| | Type of purifying agent | Flow-through halogen gas | Impurity added | | Piping corrosion |
|---|---|---|---|---|---|
| Example 1 | A | $Cl_2$ | HCl | $H_2O$ | none |
| Example 2 | B | $Cl_2$ | HCl | $H_2O$ | none |
| Example 3 | C | $Cl_2$ | HCl | $H_2O$ | none |
| Example 4 | D | $Cl_2$ | HCl | $H_2O$ | none |
| Example 5 | E | $Cl_2$ | HCl | $H_2O$ | none |
| Example 6 | F | $Cl_2$ | HCl | $H_2O$ | none |
| Example 7 | G | $Cl_2$ | HCl | $H_2O$ | none |
| Example 8 | A | $F_2$ | HF | $H_2O$ | none |
| Comparative Example 1 | — | $Cl_2$ | HCl | $H_2O$ | severe |
| Comparative Example 2 | — | $Cl_2$ | — | — | somewhat |

Remarks
$Cl_2$: Chlorine gas
$F_2$: Fluorine gas
HCl: Hydrogen chloride
HF: Hydrogen fluoride
$H_2O$: Moisture

What is claimed is:

1. A process for purifying a halogen-containing gas which comprises bringing said halogen-containing gas into contact with a purifying agent comprising a hydroxide of an alkaline earth metal and an iron oxide to remove at least one member selected from the group consisting of hydrogen halogenides and moisture that are contained as impurities in said halogen-containing gas.

2. The process according to claim 1 wherein the purifying agent is a product which is molded from a composition comprising a mixture of a hydroxide of an alkaline earth metal and an iron oxide.

3. The process according to claim 1 wherein the purifying agent is a product which is molded form a composition comprising a blend of a hydroxide of an alkaline earth metal, an iron oxide and a carrier material.

4. The process according to claim 1 wherein the halogen-containing gas comprises at least one member selected from the group consisting of chlorine gas, fluorine gas and bromine gas.

5. The process according to claim 1 wherein the halogen-containing gas comprises at least one member selected from the group consisting of chlorine gas, fluorine gas and bromine gas, said halogen-containing gas being diluted with an inert gas.

6. The process according to claim 1 wherein the hydrogen halogenide is at least one member selected from the group consisting of hydrogen chloride, hydrogen fluoride and hydrogen bromide.

7. The process according to claim 1 wherein the blending ratio of the hydroxide of an alkaline earth metal to the iron oxide is 15:1 to 1:12 expressed in terms of M:Fe atomic ratio wherein M stands for an alkaline earth metal atom.

8. The process according to claim 1 wherein the hydroxide of an alkaline earth metal is strontium hydroxide.

9. The process according to claim 1 wherein the iron oxide is at least one member selected from the group consisting of triiron tetraoxide, iron (II) oxide, iron (II) hydroxide, iron (III) oxide and iron (III) hydroxide.

10. The process according to claim 9 wherein the content of triiron tetraoxide in the iron oxide is at least 60% by weight.

11. The process according to claim 2 wherein the composition further comprises as a binding agent at least one member selected from the group consisting of polyvinyl alcohol, polyethylene glycol, polypropylene glycol, methylcellulose and carboxymethylcellulose.

12. The process according to claim 1 wherein the hydroxide of an alkaline earth metal is at least one selected from the group consisting of strontium hydroxide, calcium hydroxide and magnesium hydroxide; the iron oxide is selected from the group consisting of triiron tetraoxide, iron (II) oxide, iron (III) oxide, iron (II) hydroxide and iron (III) hydroxide; and the hydroxide of an alkaline earth metal to the iron oxide is in a ratio of 15:1 to 1:12 expressed in terms of an M:Fe atomic ratio, wherein M is the amount of the alkaline earth metal.

13. The process according to claim 12 wherein the halogen-containing gas is at least one gas selected from the group consisting of chlorine gas, fluorine gas and bromine gas and the hydrogen halogenide is at least one member selected from the group consisting of hydrogen chloride, hydrogen fluoride and hydrogen bromide.

14. The process according to claim 13 wherein the ratio of the hydroxide of an alkaline earth metal to the iron oxide is 10:1 to 1:6.

15. The process according to claim 14 wherein the contact is carried at a temperature of 200° C. or lower and at a pressure of at most 20 kg/cm² absolute.

16. The process according to claim 15 wherein the pressure is 0.1 to 10 kg/cm² absolute.

17. The process according to claim 16 wherein the alkaline earth metal is strontium hydroxide and the iron oxide contains at least 60 weight % triiron tetraoxide.

18. The process according to claim 16 wherein the iron oxide is $Fe_3O_4$ and the hydroxide of an alkaline earth metal is strontium hydroxide.

19. The process according to claim 1 wherein the contacting is carried out at a temperature of 200° C. or less.

* * * * *